(12) United States Patent
Hui et al.

(10) Patent No.: US 12,401,972 B2
(45) Date of Patent: Aug. 26, 2025

(54) INTELLIGENT SPEECH CONTROL FOR TWO WAY RADIO

(71) Applicant: BITwave Pte Ltd, Singapore (SG)

(72) Inventors: Siew Kok Hui, Singapore (SG); Eng Sui Tan, Singapore (SG)

(73) Assignee: BITWAVE PTE LTD, Singapore (SG)

( * ) Notice: Subject to any disclaimer, the term of this patent is extended or adjusted under 35 U.S.C. 154(b) by 499 days.

(21) Appl. No.: 17/823,816

(22) Filed: Aug. 31, 2022

(65) Prior Publication Data

US 2023/0110708 A1   Apr. 13, 2023

Related U.S. Application Data

(60) Provisional application No. 63/254,352, filed on Oct. 11, 2021.

(51) Int. Cl.
| | | |
|---|---|---|
| H04W 4/10 | (2009.01) | |
| G10L 15/22 | (2006.01) | |
| G10L 25/78 | (2013.01) | |
| H04W 4/80 | (2018.01) | |

(52) U.S. Cl.
CPC ............... *H04W 4/10* (2013.01); *G10L 15/22* (2013.01); *G10L 25/78* (2013.01); *H04W 4/80* (2018.02)

(58) Field of Classification Search
CPC .......... H04W 4/10; H04W 4/80; G10L 25/78; G10L 15/00; H04M 2250/02; H04M 1/6066
See application file for complete search history.

(56) References Cited

U.S. PATENT DOCUMENTS

| | | | | |
|---|---|---|---|---|
| 11,153,678 | B1* | 10/2021 | Jorgovanovic | H04W 76/14 |
| 2004/0198425 | A1* | 10/2004 | Mellone | H04M 1/6066 |
| | | | | 455/574 |
| 2005/0245203 | A1* | 11/2005 | Vance | H04L 65/4061 |
| | | | | 455/78 |
| 2006/0270468 | A1* | 11/2006 | Hui | H04M 9/082 |
| | | | | 455/570 |
| 2007/0004464 | A1* | 1/2007 | Lair | H04M 1/6066 |
| | | | | 455/569.1 |
| 2010/0271983 | A1* | 10/2010 | Bryant | H04B 1/385 |
| | | | | 370/352 |
| 2022/0078584 | A1* | 3/2022 | Chen | H04L 61/50 |
| 2023/0263258 | A1* | 8/2023 | Chudasama | G06F 3/167 |
| | | | | 701/2 |

* cited by examiner

*Primary Examiner* — Angelica Perez
(74) *Attorney, Agent, or Firm* — Amin, Turocy & Watson, LLP

(57) ABSTRACT

The present application provides various embodiments for a Bluetooth headset or other wearable communication device that pairs via a Bluetooth protocol with a two way radio (hardware or software), thereby enabling hands-free activation and deactivation of the paired two way radio. Intelligent speech control is enabled for the two way radio using a start phrase to trigger talk or transmit mode of the two way radio and an end phrase to trigger the receive or listen mode of the two way radio. Tones can be emitted when a mode is entered as feedback to the user as to which mode the two way radio has entered.

20 Claims, 12 Drawing Sheets

Detecting, by a wearable Bluetooth communication system comprising a processor, at least one speaker and at least one microphone, a trigger word or phrase represented by a first sound signal generated at least in part by a first voice of a first user of the wearable Bluetooth communication system, resulting in a detected trigger word or phrase, the detected trigger word or phrase comprising one of a transmission mode trigger word or phrase or a reception mode trigger word or phrase

1004 wherein the wearable Bluetooth communication system is usable by the first user without use of a hand of the first user wherein the wearable Bluetooth communication system is pairable with a local Bluetooth two way radio, within a Bluetooth connection range of the wearable Bluetooth communication system defined by a Bluetooth communication protocol, the local Bluetooth two way radio being configured to, using a second communication protocol different than the Bluetooth communication protocol, transmit or receive signals, respectively, to or from a remote two way radio, in response to being in a transmission mode or a reception mode, respectively

1006 in response to the detected trigger word or phrase being determined to be the transmission mode trigger word or phrase, directing, by the wearable Bluetooth communication system, the local two radio to be in the transmission mode, entering, by the wearable Bluetooth communication system, the transmission mode, rendering, by the at least one speaker, a second sound signal indicative of the transmission mode, to the first user, and sending, by the wearable Bluetooth communication system to the local Bluetooth two way radio using the Bluetooth communication protocol, the first sound signal and the second sound signal indicative of the transmission mode, in furtherance of the first sound signal and the second sound signal being further sent to the remote two way radio to be rendered to a second user of the remote two way radio

FIG. 10

INTELLIGENT SPEECH CONTROL FOR TWO WAY RADIO

RELATED APPLICATION

The subject patent application claims priority to U.S. Provisional Patent Appln. No. 63/254,352 filed Oct. 11, 2021, entitled "An Intelligent Speech Control User Interface for Two Way Radio in Hostile Noisy Environment". The entirety of the aforementioned priority application is hereby incorporated by reference herein.

TECHNICAL FIELD

The present application is in the field of speech communication and, for instance, to intelligent speech control for a two way radio, and corresponding user interfaces therefor, e.g., a Bluetooth device for interfacing to a two way radio system.

BACKGROUND

In a conventional two way radio, embedded with Bluetooth Rx/Tx (Receiver and Transmitter), the two way radio can connect to a Bluetooth headset for wireless voice communication. Two way radios are normally half duplex, so a push-to-talk (PTT) button is conventionally used to enable the radio to transmit when the user wants to communicate with another party by pressing the PTT button. At the end of the communication, the user can alert the other party and release the button. To alert the other party, the user typically uses the key word "Over", to let the other party aware that he or she is now ready to listen. When the PTT button is pressed, the radio is in the transmitting mode and when the button is released, the radio is back in the receiving mode.

Two way radios are widely used in many fields such as building and construction, industry, security, outdoor settings, etc. In certain situations where the user's hands are busy, use of the radio is not feasible because the user cannot activate the PTT button. A current solution to overcome such limitation is using voice activity detection (VOX). With VOX, acoustic sensors detect sound in the environment and when the sound exceeds a noise threshold, the radio is activated and placed in the transmitting mode.

In this regard, as indicated by the diagram 100 in FIG. 1, VOX activates transmission when the signal exceeds a noise threshold level, such as the noise threshold indicated at the dashed line 108, for example, and will deactivate transmission when signal drops below the noise threshold level for a fixed timeout interval. In FIG. 1, the signal at 102 exceeds the noise threshold level 108 and thus transmission mode is started or entered, and such mode continues while the signal varies in intensity increasing and decreasing with respect to the noise threshold level 108. Once the signal reaches 104, it is noted that the signal has decreased below the noise threshold level 108 and stays below the noise threshold level for the timeout period of time represented between 104 and 106, after which transmission mode is stopped or exited, until the noise threshold level 108 is exceeded once again. While VOX therefore does not require a PTT button to activate transmission, VOX has low accuracy and a high false activation rate. For example, it may be triggered by any sound or noise that is loud enough to pass the noise threshold, such as a user's cough or sneeze in front of the mic. Or even worse, in a high noise level situation, the VOX will keep the radio in the transmit mode all the time and the user may not be aware.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In various embodiments, the present application provides a Bluetooth device, such as a Bluetooth headset or other wearable communication device, that pairs with a two way radio, and also relates to processing methods and non-transitory machine-readable media that enable hands-free activation and deactivation of the paired two way radio.

An example embodiment of the present application provides a method, comprising detecting, by a wearable Bluetooth communication system comprising a processor, at least one speaker and at least one microphone, a trigger word or phrase represented by a first sound signal generated at least in part by a first voice of a first user of the wearable Bluetooth communication system, resulting in a detected trigger word or phrase, the detected trigger word or phrase comprising one of a transmission mode trigger word or phrase or a reception mode trigger word or phrase, the wearable Bluetooth communication system is usable by the first user without use of a hand of the first user, the wearable Bluetooth communication system is pairable with a local Bluetooth two way radio, within a Bluetooth connection range of the wearable Bluetooth communication system defined by a Bluetooth communication protocol, the local Bluetooth two way radio being configured to, using a second communication protocol different than the Bluetooth communication protocol, transmit or receive signals, respectively, to or from a remote two way radio, in response to being in a transmission mode or a reception mode, respectively; and in response to the detected trigger word or phrase being determined to be the transmission mode trigger word or phrase, directing, by the wearable Bluetooth communication system, the local two radio to be in the transmission mode, entering, by the wearable Bluetooth communication system, the transmission mode, rendering, by the at least one speaker, a second sound signal indicative of the transmission mode, to the first user, and sending, by the wearable Bluetooth communication system to the local Bluetooth two way radio using the Bluetooth communication protocol, the first sound signal and the second sound signal indicative of the transmission mode, in furtherance of the first sound signal and the second sound signal being further sent to the remote two way radio to be rendered to a second user of the remote two way radio.

Another example embodiment of the present application relates to in response to the detected trigger word or phrase being determined to be the reception mode trigger word or phrase, entering, by the wearable Bluetooth communication system, the reception mode, directing, by the wearable Bluetooth communication system, the local Bluetooth two way radio to be in the reception mode, sending, by the wearable Bluetooth communication system to the local Bluetooth two way radio using the Bluetooth communication protocol, a third sound signal indicative of the reception mode, in furtherance of the third sound signal being further sent to the remote two way radio to be rendered to the second user of the remote two way radio, receiving, by the wearable Bluetooth communication system, a fourth sound signal, which was generated at least in part by a second voice of the second user of the remote two way radio and received by the wearable Bluetooth communication system via the local two way radio from the remote two way radio, and rendering, by the at least one speaker, the third sound signal indicative of the reception mode and the fourth sound signal, to the first user.

Another example embodiment relates to the entering of the transmission mode comprises opening a transmission channel to the local Bluetooth two way radio usable to transmit signals to the remote two way radio via the local Bluetooth two way radio, and the entering of the reception mode comprises closing the transmission channel and opening a reception channel to the local Bluetooth two way radio usable to receive signals from the remote two way radio via the local Bluetooth two way radio.

Another example embodiment of the present application relates to the directing of the local Bluetooth two radio to be in the transmission mode comprises sending a first command packet comprising at least one of a first packet type associated with the transmission mode, a first data length associated with the first command packet, or a first command identifier associated with the first command packet and the directing of the local Bluetooth two radio to be in the reception mode comprises sending a second command packet comprising at least one of a second packet type associated with the reception mode, a second data length associated with the second command packet, or a second command identifier associated with the second command packet.

Another example embodiment of the present application relates to rendering, by the at least one speaker, the first sound signal to the first user, at least one of the second sound signal indicative of the transmission mode is represented as a first tonal sound signal representative of a first tone signifying the transmission mode, or the fourth sound signal indicative of the reception mode is represented as a second tonal sound signal representative of a second tone, different than the first tone, signifying the reception mode.

Another example embodiment of the present application relates to detecting, by the wearable Bluetooth communication system, at least a defined period of absence of the first voice of the first user; in response to the detecting of at least the defined period of absence of the first voice of the first user, entering, by the wearable Bluetooth communication system, the reception mode, directing, by the wearable Bluetooth communication system, the local Bluetooth two radio to be in the reception mode, sending, by the wearable Bluetooth communication system to the local Bluetooth two way radio using the Bluetooth communication protocol, a third sound signal indicative of the reception mode, in furtherance of the third sound signal being further sent to the remote two way radio to be rendered to the second user of the remote two way radio, receiving, by the wearable Bluetooth communication system, a fourth sound signal, which was generated at least in part by a second voice of the second user of the remote two way radio and received by the wearable Bluetooth communication system via the local two way radio from the remote two way radio, and rendering, by the at least one speaker, the fourth sound signal and the third sound signal indicative of the reception mode, to the first user.

Another example embodiment of the present application relates to the wearable Bluetooth communication system comprising part of a Bluetooth headphone, a Bluetooth headset, at least one Bluetooth earbud, a Bluetooth helmet, at least one Bluetooth earbud, a Bluetooth armband, a Bluetooth watch, or a Bluetooth jewelry.

Another example embodiment of the present application relates to identifying, by the wearable Bluetooth communication system, a noise signal associated with the first sound signal, and processing, by the wearable Bluetooth communication system, the first sound signal to substantially reduce or eliminate the noise signal from the first sound signal, resulting in a processed first sound signal, the sending of the first sound signal comprises sending, to the local Bluetooth two way radio, the processed first sound signal.

Another example embodiment of the present application relates to processing of the first sound signal comprising applying at least one of echo cancellation, interference sound cancellation, or environmental noise cancellation to the first sound signal to substantially reduce or eliminate the noise signal from the first sound signal.

Another example embodiment of the present application relates to receiving authorized user input, associated with the first user, that specifies at least one of the transmission mode trigger word or phrase or the reception mode trigger word or phrase.

Another example embodiment of the present application relates to the local Bluetooth two way radio being a software two-way radio application that is executing via a mobile device paired with the wearable Bluetooth communication system using the Bluetooth communication protocol and that communicates with a corresponding software two-way radio application of the remote two way radio.

Another example embodiment of the present application relates to, as an alternative to the directing, the entering, the rendering, and the sending being in response to the detected trigger word or phrase being determined to be the transmission mode trigger word or phrase, performing the directing, the entering, the rendering, and the sending in response to a push to talk button of the wearable Bluetooth communication system being activated.

Another example embodiment of the present application relates to a Bluetooth headset, comprising a Bluetooth module configured to pair wirelessly, according to a Bluetooth protocol, with a first two way radio of a two way radio system, the two way radio system comprising the first two way radio of the two way radio system that is within a Bluetooth communication range of the Bluetooth headset, and a second two way radio that is not within the Bluetooth communication range of the Bluetooth headset, a voice command engine configured to detect a trigger sound from a voice input associated with a user of the Bluetooth headset, the trigger sound being one of a first trigger sound that, based on the Bluetooth headset and the two way radio system being in a receive sound mode, activates a transmit sound mode of the Bluetooth headset, or a second trigger sound that, based on the Bluetooth headset and the two way radio system being in the transmit sound mode, activates a receive sound mode of the Bluetooth headset, and a flow control engine configured to, based on the trigger sound being determined to be the first trigger sound, send a first command to the first two way radio to activate the transmit sound mode in the first two way radio, in the transmit sound mode, the first two way radio relays, to the second two way radio, first sound that has been input to the Bluetooth headset after the trigger sound, processed by the Bluetooth headset, and output by the Bluetooth headset via the Bluetooth protocol to the first two way radio, or, based on the trigger sound being determined to be the second trigger sound, send a second command to the first two way radio to activate the receive sound mode in the first two way radio, in the receive sound mode, the first two way radio relays, to the Bluetooth headset, second sound that has been output by the second two way radio to first two way radio, and received by the Bluetooth headset via the Bluetooth protocol from the first two way radio.

Another example embodiment of the present application relates to the voice command engine being further configured to, based on the trigger sound being determined to be the first trigger sound, output at least one first tonal sound from the Bluetooth headset to the user to indicate the transmit sound mode has been activated in the Bluetooth headset and first two way radio, or, based on the trigger sound being determined to be the second trigger sound, output at least one second tonal sound from the Bluetooth headset to the user to indicate the receive sound mode has been activated in the Bluetooth headset and first two way radio.

Another example embodiment of the present application relates to the voice command engine being further configured to, based further on the trigger sound being determined to be the first trigger sound, relay the at least one first tonal sound from the Bluetooth headset to the second two way radio via the first two way radio to be rendered at the second two way radio, or, based further on the trigger sound being determined to be the second trigger sound, output the at least one second tonal sound from the Bluetooth headset to the second two way radio via the first two way radio to be rendered at the second two way radio, the at least one first tonal sound comprises at least one same tonal sound as the at least one second tonal sound.

Another example embodiment of the present application relates the trigger sound being determined to be the first trigger sound, and the voice command engine is configured to output at least one first tonal sound from the Bluetooth headset to the user to indicate the transmit sound mode has been activated in the Bluetooth headset and first two way radio, in response to an elapsing of at least a defined period of voice inactivity from the user, send a second command to the first two way radio to activate the receive sound mode in the first two way radio, output at least one second tonal sound from the Bluetooth headset to the user to indicate the receive sound mode has been activated in the Bluetooth headset and first two way radio, and output the at least one second tonal sound from the Bluetooth headset to the second two way radio via the first two way radio to be rendered at the second two way radio.

Another example embodiment of the present application relates to detection of the trigger sound, by the voice command engine, from the voice input associated with the user of the Bluetooth headset comprises the detection of the voice input from all sound input concurrently received by the Bluetooth headset, the detection of the voice input from all of the sound input comprising a processing of all of the sound input received by the Bluetooth headset to increase a defined clarity of the voice input relative to other sound inputs of all of the sound input other than the voice input, and the processing comprising at least one of applying at least one of an echo cancellation process to substantially reduce or eliminate echo sound input relating to delayed reproduction of the voice input, an interference reduction process to reduce an interference associated with the voice input, an interference cancellation process to eliminate the interference associated with the voice input, an environmental sound reduction process to reduce an environmental sound input associated with an environment in which the Bluetooth headset is situated, or an environmental noise cancellation process to eliminate the environmental sound input associated with the environment.

Another example embodiment of the present application relates to the Bluetooth module being further configured to pair with a mobile device associated with the user, the voice command engine is further configured to detect a third trigger sound as the trigger sound, and detection of the third trigger sound, based on the Bluetooth headset being in the receive sound mode or the transmit sound mode, causes the Bluetooth headset to switch from being paired with the two way radio system to being paired with a communication module of the mobile device that is not the two way radio system, and activates a mobile device transmit and receive mode of the Bluetooth headset that enables bi-directional sound to be communicated, via the mobile device, between the user of the Bluetooth headset and another user of another mobile device to which the mobile device is communicatively coupled.

Another example embodiment of the present application relates to a non-transitory machine-readable medium, comprising executable instructions that, when executed by a processor of a communication system, facilitate performance of operations, comprising detecting a trigger word or phrase from voice input associated with a user of a Bluetooth headset, the trigger word or phrase being one of a first trigger word or phrase that activates a transmit audio mode applicable to transmission via a two way radio communication system, one radio of the two way radio communication system is paired directly with the communication system via a Bluetooth connection and another radio of the two way radio communication system is not paired directly with the communication system, or a second trigger word or phrase that activates a receive audio mode applicable to reception via the two way radio communication system and in response to the trigger word or phrase being determined to be the first trigger word or phrase, sending a first command to the one radio to activate the transmit audio mode in the two way radio communication system, in the transmit audio mode, the one radio relays, to the other radio, first audio that has been input to the communication system, processed by the communication system, and output by the communication system via the Bluetooth connection to the one radio, or in response to the trigger word or phrase being determined to be the second trigger word or phrase, send a second command to the one radio to activate the receive audio mode in the two way radio communication system, in the receive audio mode, the one radio relays, to the communication system, second audio that has been output by the other radio to the one radio, and received by the communication system via the Bluetooth connection from the one radio.

Another example embodiment of the present application relates to at least one of in response to activation of the transmit audio mode, generating and rendering a first tonal sound to a user of the communication system to indicate the activation of the transmit sound mode to the user, or in response to activation of the receive audio mode, generating and rendering a second tonal sound, different from the first tonal sound, to the user of the communication system to indicate the activation of the receive audio mode to the user.

BRIEF DESCRIPTION OF THE DRAWINGS

FIG. 10 is yet another example flow diagram applicable to using a communication device in communication with a two way communication system in accordance with various embodiments described herein.

DETAILED DESCRIPTION

Figure 1:
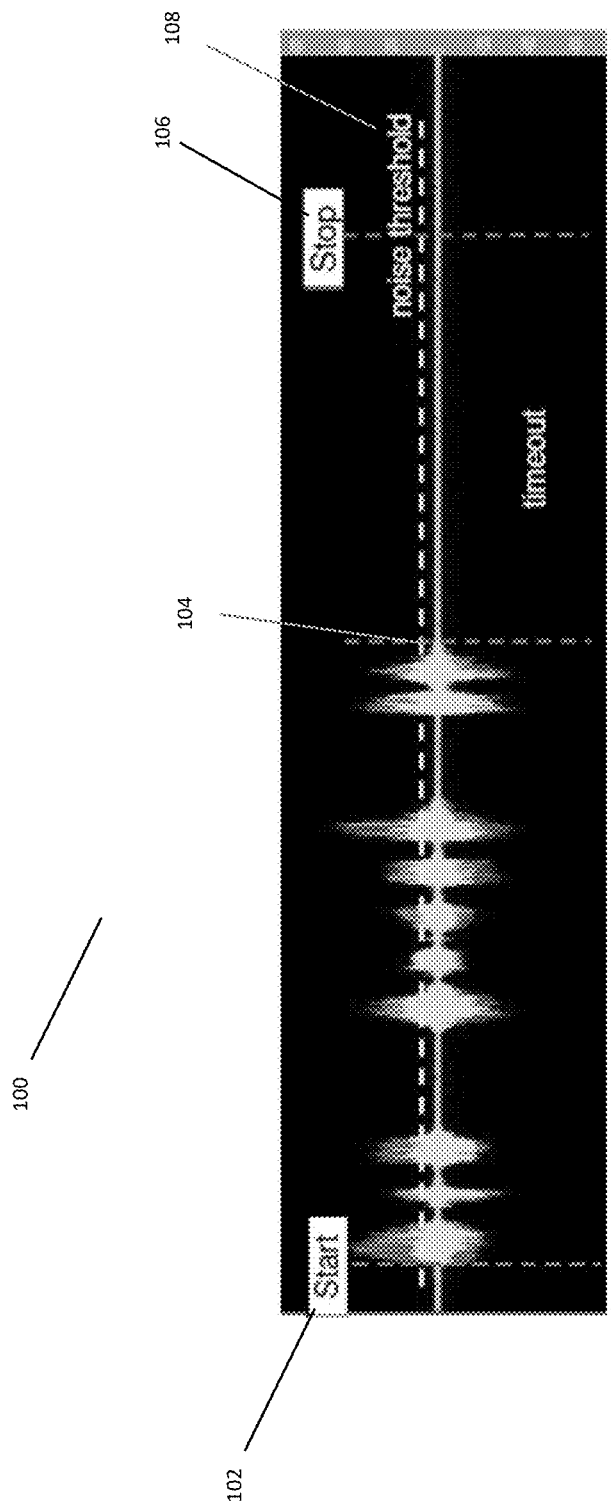
FIG. 1 depicts a conventional VOX triggered technique for activating a two way radio using a sound threshold.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

As mentioned, the present application is in the field of speech communication which relates to, in one example embodiment, hands-free Bluetooth headset systems that pair with two way radios embedded with Bluetooth transmitter and receiver allowing hands-free switching of the paired radio between transmission mode and receiving mode.

One main application or benefit the one or more embodiments described herein is for hands-free activation and deactivation of an associated Bluetooth two way radio. As mentioned in the background, two way radios that use VOX have a high false-trigger rate. VOX detects sound signal amplitude and transmits when the sound signal exceeds a threshold. This causes the two way radio to transmit when the user did not so intend. In a high noise environment, the VOX system could constantly signal the radio to be in transmit mode and prevent reception of any incoming audio signals. The above-mentioned deficiencies of conventional voice control of two way radios are overcome by various embodiments presented herein of a Bluetooth device, such as a Bluetooth headset that pairs with the two way radio system. The present embodiments are illustrated by way of example, but not limited to the figures and the accompanying drawings.

In an example embodiment, a Bluetooth headset is embedded with a speech recognition engine. In this embodiment, instead of using the PTT button or VOX to activate the radio, the radio is now activated by the speech recognition engine. To activate the radio, the user speaks a command such as "Activate Radio" instead of pushing the PTT button. The Bluetooth headset issues a command to an associated Bluetooth two way radio to be in transmit mode. The radio is now active and the user can talk through the radio. At the end of the conversation, the user can issue another command such as "Over Radio". The Bluetooth headset issues a command to the associated Bluetooth two way radio to be in receive mode. Upon the receiving of this command, the associated Bluetooth two way radio will stop transmission and enter the receiving mode.

Another example system comprises acoustic sensors for audio signal acquisition, processor for echo cancellation, interference sound cancellation, extreme wind noise and environment noise reduction and noise cancellation capabilities, e.g., pertaining to methods and apparatus that facilitate such audio application and wireless communication.

A Bluetooth two-way radio setup may comprise a very high frequency (VHF)/ultra high frequency (UHF) two way radio with Bluetooth module, a remote control PTT and a Bluetooth headset, though any frequency band suitable for communicating between a pair of two way radios is suitable.

In a typical use case, the Bluetooth headset pairs with an associated Bluetooth two-way radio, with audio from the radio being routed to the headset and, when intended by the user, audio from the headset being routed to the radio. A voice command interface provides a way to activate the transmit function of the Bluetooth two way radio hands-free. In this example, the voice command interface is implemented in the Bluetooth headset and utilizes a voice command engine and a flow control engine. The voice command engine, together with a proper flow control, can replace the PTT function in a natural way, as described for various embodiments herein.

In an example embodiment of the voice command interface, the system can detect a trigger word to start the 'talk mode', for example, a user can say "Activate Radio" as the trigger word. Once this trigger word is detected by the speech engine, a command will be sent to the radio to start the transmit channel. A tone such as 'beep' will be playback through the speaker, so that the user will know the two-way radio is in talking mode. After the transmit channel is opened, the user can start talking. Then, the system can detect a second trigger word to end the 'talk mode', or timeout due to a period of a lack of user speech. To end the talking mode, a user can say a trigger word, such as "Over Radio" after the last sentence. Once this trigger word is detected by the speech engine, a command will be sent to the Bluetooth two way radio to stop the transmission. Alternatively, the speech engine can timeout automatically if the user stops talking for a specified amount of time, e.g., about 2 seconds, which can be a default amount of time in the absence of being specified. When timeout due to silence is detected, a command will be sent to the radio to stop the transmission. When the transmission stops, the two-way radio will enter the listening mode. A tone can also be sent to the user to inform the user that the radio is back to the listening mode and transmission has stopped. To start talking again, the user can issue the command again "Activate Radio".

In an example embodiment of a command packet sent from the headset to the Bluetooth two way radio, the packet can contain at least the following information: Packet type (ex: Command packet, Event packet, Voice packet etc.), Data length (to specify how m any bytes of data are in the packet) and Command ID (to specify the command to be executed, for example 0—to stop the transmission (listening mode) or 1—to start the transmission (talking mode)).

In an example embodiment, to ensure a high detection rate by the voice command engine and overall user friendliness of the interface, a user can define the start phrase—the trigger words to start the talking mode (enabling two-way radio transmission)—as any phrase such as 'Activate Radio', the phrase can be less than 1.5 seconds. Once the start phrase is detected, the system enters the talking mode and the user can now transmit over the two-way radio without any constraints. To end the talking mode by voice command, the user can say a trigger word such as 'Over Radio' at the end of the user's last sentence. However, in one embodiment, it is contemplated that the user should give a short pause, e.g., for at least 0.2 sec, between the 'Over Radio' and last word of the conversation and/or a short pause after the utterance of "Over Radio" to more clearly divine user intent by the voice recognition engine. The end phrase can be any words defined by the user and can be less than 1.5 seconds. Alternatively, or in addition to the end phrase, a user may just keep silent for a specified amount of time, the silence detector will activate and send a command to end the talking mode automatically. A silence period of 1 to 5 seconds, e.g., 2 seconds, can be recommended for most use cases.

The voice command interface offers many advantages over conventional VOX such as a lower false trigger, since it will only be activated when a user says the correct keywords or trigger phrase such as 'Activate Radio'. Therefore, it does not have the problem of VOX of having excessive false triggers due to any noise exceeding the threshold. The voice command interface also offers shorter timeout periods, after the conversation (talking mode) is started, user does not need to wait for a fixed interval to end the conversation. The user can say the trigger phrase such as 'Over Radio' to end the conversation, creating a more natural way of communication.

The voice command interface can also support multiple communication channels. The Bluetooth headset can connect to multiple devices at the same time such as a mobile phone and a Bluetooth two-way radio. In this case, user can decide which device to communicate by speaking different trigger phrases. For example, user can say "Activate Radio" to activate the two-way radio or "hi, google/Siri" to activate the phone. Each trigger phrase may be defined by the user. The Bluetooth headset may issue a command to the phone to close the communication channel.

The voice command interface can be adapted for many applications such as software based two-way radios running on a mobile app, the user can activate the PTT functions using voice interface without a physical PTT button.

The Bluetooth headset can comprise at least one or two speakers. The Bluetooth headset can comprise at least one or two microphones. The microphones can be different types of microphones, for example an air conduction microphone or a bone conduction microphone.

The Bluetooth headset can render the user's voice to the user during transmission via the speaker or speakers. The Bluetooth headset can also apply one or more filters to the user's voice to enhance sound quality, or diminish or eliminate noise.

The Bluetooth headset can render an audio tone to the user through a speaker to indicate the Bluetooth two way radio is in the transmission mode. The Bluetooth headset can also render the same audio tone or a different audio tone to indicate the Bluetooth two way radio is in receiving mode. The Bluetooth headset can render the same audio tone or a different audio tone to indicate the Bluetooth headset is transmitting to a second device, other than the Bluetooth two way radio, such as a smartphone.

Figure 2:
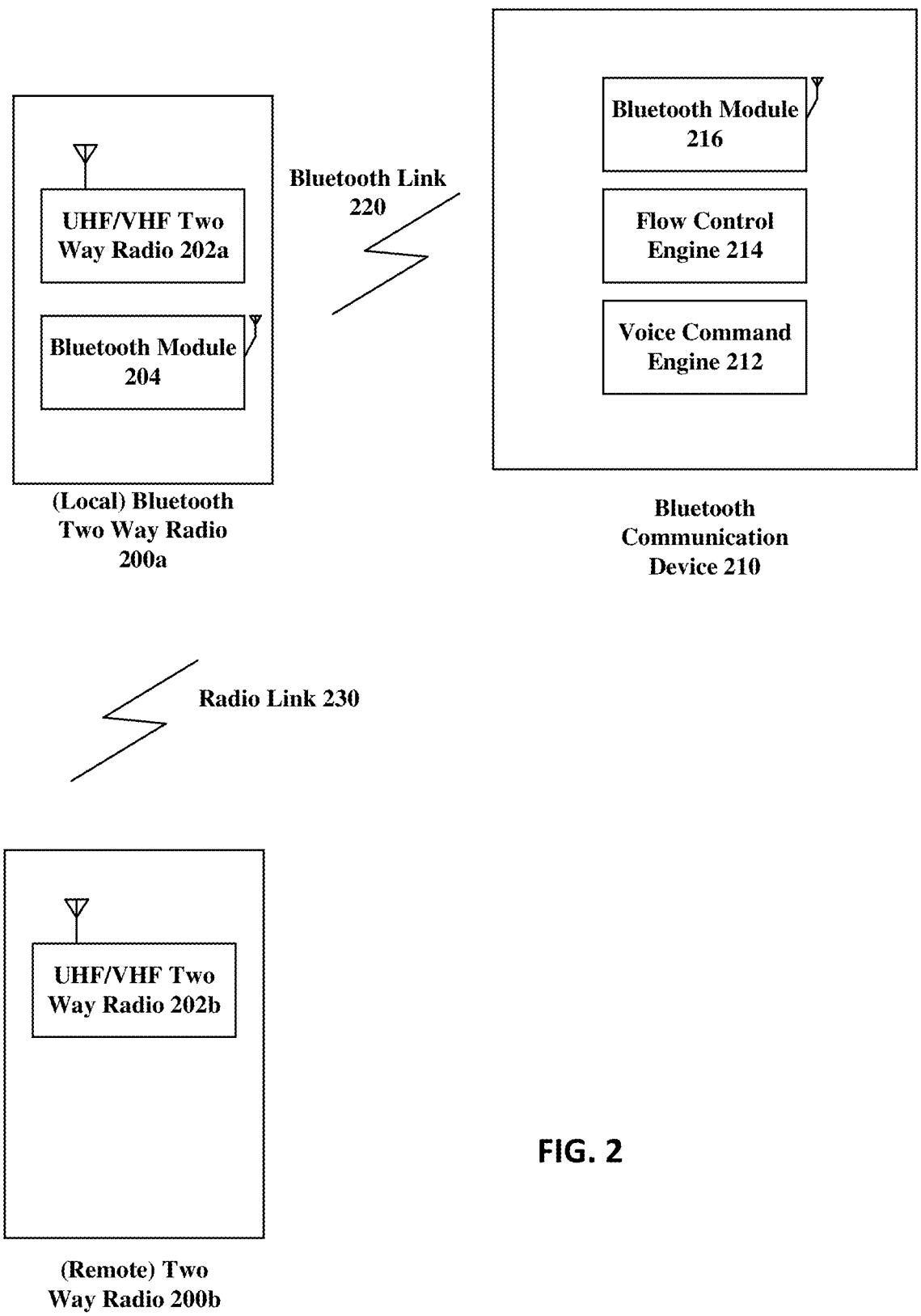
FIG. 2 depicts a Bluetooth communication device in communication with a two way radio system in accordance with various embodiments described herein.

FIG. 2 depicts a Bluetooth communication device in communication with a two way radio system in accordance with various embodiments described herein. A two way radio system comprises two radios, one for a first user, e.g., local Bluetooth two way radio 200*a*, and one for a second user that is typically remote from the first user, e.g., remote two way radio 200*b*, which are usable to communicate between the first and second user. For instance, remote two way radio 200*b* can communicate over radio link 230 using, for example, an ultra high frequency (UHF) or very high frequency (VHF) band radio component 202*b*, though any radio frequency or other frequency bands or communication protocols suitable for communication can be used. The remote two way radio 200*b*, using radio component 202*b*, communicates with the local two way radio 200*a* via its corresponding radio component 202*a*. In an example embodiment, the local two way radio 200*a* has a Bluetooth module 204 that enables it to communicate with a corresponding Bluetooth module 216 of a Bluetooth communication device 210 via Bluetooth link 220. Bluetooth communication device 210 can be a headset, a helmet, earpiece, etc. that enables hands free communication with respect to the local Bluetooth two way radio 200a. In this regard, Bluetooth communication device 210 has a flow control engine 214 that establishes what mode and commands should be generated based on voice input, and a voice command engine 212 that recognizes certain words that affect the flow specified for the flow control engine 214. The remote two way radio 200b can optionally also include a Bluetooth module, to benefit the remote user with the use of the various embodiments described herein, but it is not necessary from the perspective of the local user of the local Bluetooth two way radio and the Bluetooth device/interface to which it is paired.

Figure 3:
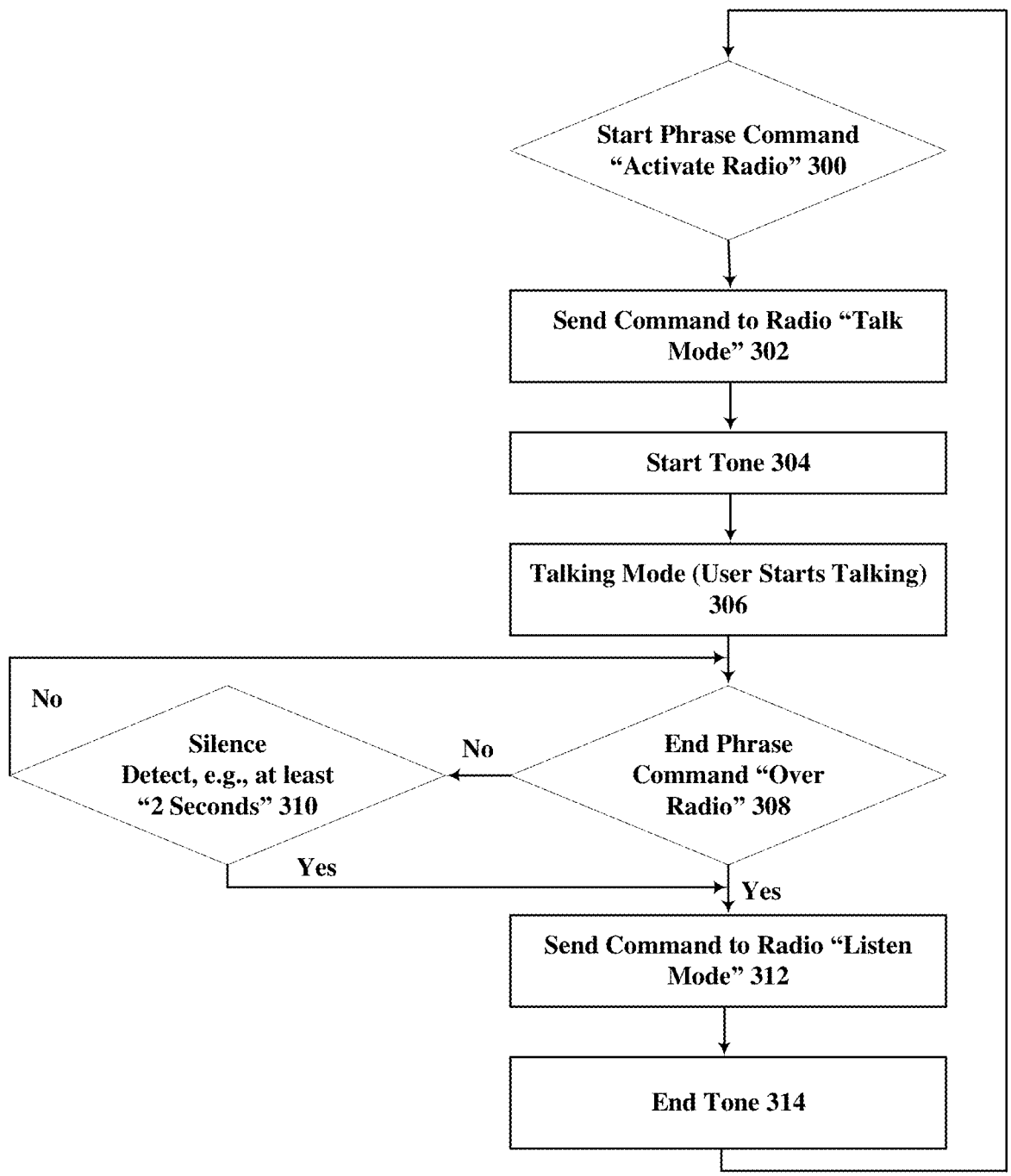
FIG. 3 is an example flow diagram applicable to using a Bluetooth communication device in communication with a two way radio system in accordance with various embodiments described herein.

FIG. 3 is an example flow diagram applicable to using a Bluetooth communication device in communication with a two way radio system in accordance with various embodiments described herein. In this regard, once the Bluetooth communication device (such as a headset, earphones, etc.) is paired with the local two way radio, the flow begins by the user of the Bluetooth communication device saying a start phrase command, such as, for example, "activate radio" at 300. Responsive to the "activate radio" command, a command is then sent to the local two way radio at 302 via the Bluetooth link to place the local two way radio into the transmission or talking mode. At 304, optionally, a tone can be emitted to the user via the Bluetooth communication device to alert the user that the local two way radio has entered the transmission or talking mode. At 306, the talking mode commences enabling the user to speak to a remote user via the Bluetooth link to the local two way radio and via the radio link from the local two way radio to the remote two way radio. The transmission or talking mode continues until the user utters the end phrase command, e.g., "Over Radio" at 308, which can send the flow to 312 to place the local two way radio back into the receive or listen mode enabling sound from the remote two way radio to be received and heard by the user of the headset via the local two way radio. Optionally, to avoid any confusion over whether the end command such as "Over Radio" was intended, or merely part of a sentence by a user without intending to stop talking, the system can wait for a preset amount of silence as shown at 310, such as 2 seconds of silence passing after the end command is uttered. Once back in the receive or listen mode, optionally, another tone can be played at 314 to signal that the local two way radio is back in the receive or listen mode. The tone can be the same tone, but sounded a different number of times to distinguish the modes, e.g., once for the transmit mode or two for the receive mode. Or the tones for the transmit mode and the receive mode can be different to distinguish the modes. And then the flow returns to 300 and stays in the receive mode until the start phrase command is uttered again to begin the flow again as described above.

Figure 4:
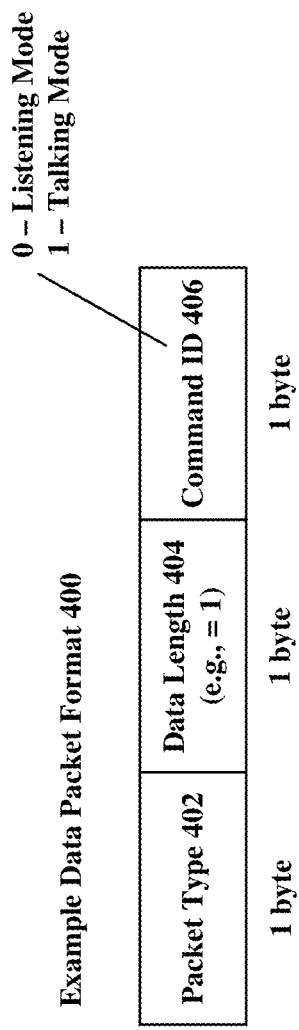
FIG. 4 is an example data packet format that can be applied to use of a Bluetooth communication device in communication with a two way radio system in accordance with various embodiments described herein.

FIG. 4 is an example data packet format that can be applied to use of a Bluetooth communication device in communication with a two way radio system in accordance with various embodiments described herein. In this regard, the example data packet format 400 is compact, e.g., 1 byte for packet type 402, 1 byte for data length 404, e.g., data length=1, and further has a command ID 406 that is 1 byte, e.g., 0 places the local two way radio into listening mode (receive mode) and 1 places the local two way radio into talking mode (transmit mode), or vice versa. The data packet format illustrated in FIG. 4 is just one example of a format that can be used to instruct the local two way radio by the Bluetooth communication device as to what mode to enter as part of the process flow.

Figure 5:
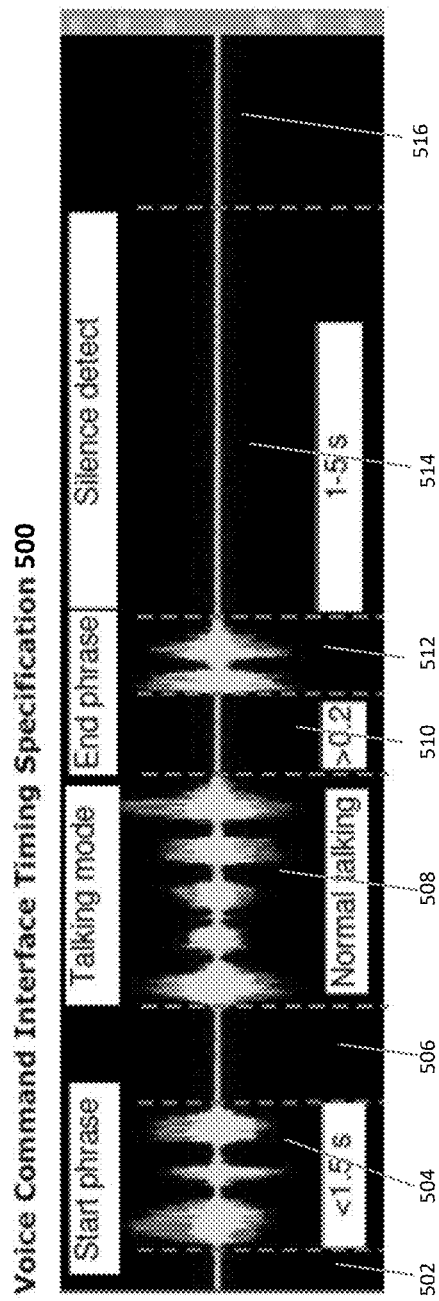
FIG. 5 illustrates an example voice command interface and corresponding timing for an example sound sequence in accordance with various embodiments described herein.
Figure 6:
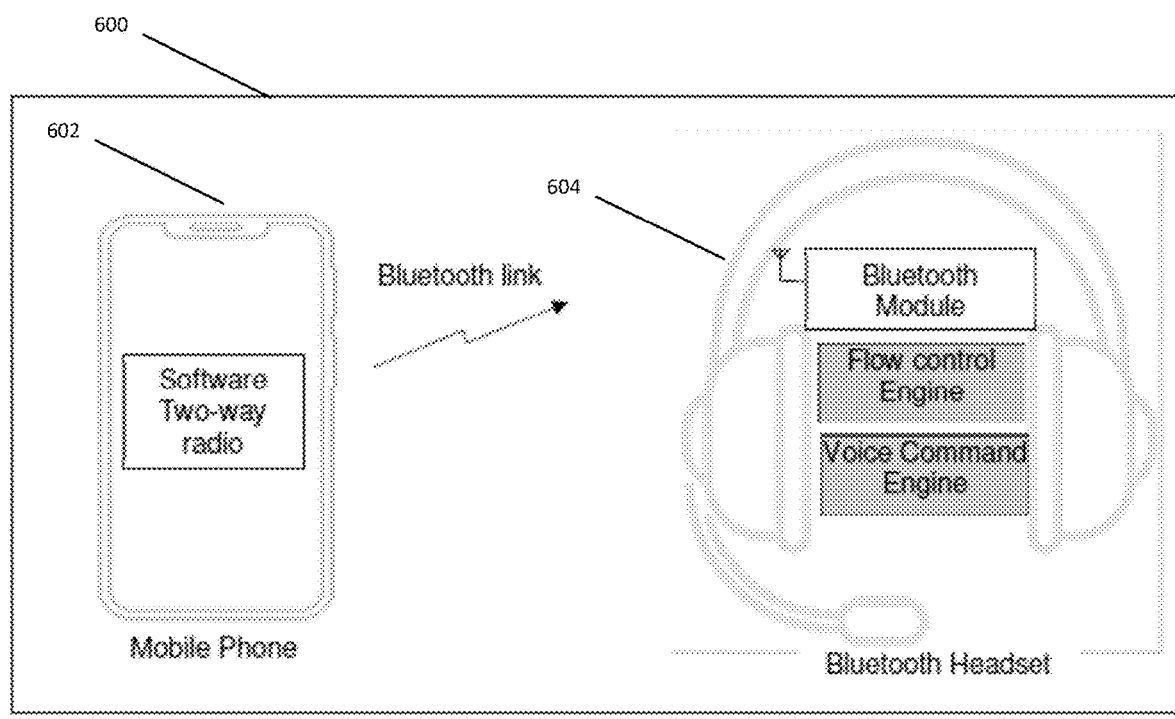
FIG. 6 is a block diagram of an embodiment in which a smart device comprises a software implementation of a two way radio in accordance with various embodiments described herein.

FIG. 5 illustrates an example voice command interface and corresponding timing for an example sound sequence in accordance with various embodiments described herein. For instance, at the start, the user is not talking at 502 into the Bluetooth communication device. At 504, the user utters the activate or start phrase, e.g., "Activate Radio", that triggers the transmit mode of the local two way radio. In this regard, optionally a wait period of silence 506 can be undertaken after the activate command to clearly divine the intent of the user and/or to take time to ensure that the local two way radio has been placed into the transmit or talking mode at 508. Following the user's talking during 508, there might be a short period of silence as shown at 510, but this is not enough to trigger departure out of the talking mode. Eventually, however, the user may wish to end the talking mode by uttering the end phrase, such as "Over Radio," at 512, after which the system can optionally wait for a silence period (e.g., 1-5 seconds) at 514 to ensure that the user meant for the talking mode to be over. Finally, at 516, the local two way radio is placed back into the listening mode once it is determined that the user was finished talking FIG. 6 is a block diagram of an embodiment in which a smart device comprises a software implementation of a two way radio in accordance with various embodiments described herein. In the system 600 of FIG. 6, instead of a two way radio system involving local and remote hardware that communicates using radio frequencies, a smart device 602, such as a mobile phone, instead simulates the two way radio experience in software via a local software app and a remote software app. The embodiment is otherwise similar in that when the local software is in transmit mode, the remote software is in receive mode, and vice versa. And the Bluetooth module, flow control engine and voice command engine of the Bluetooth communication device (here illustrated as a headset) work with the software via the Bluetooth link to control the mode of transmission rather than issuing commands to the local two way radio hardware. In this example embodiment, the hands free voice control as described above in FIGS. 2-5 are applicable instead to control the software two way radio system.

Figure 7:
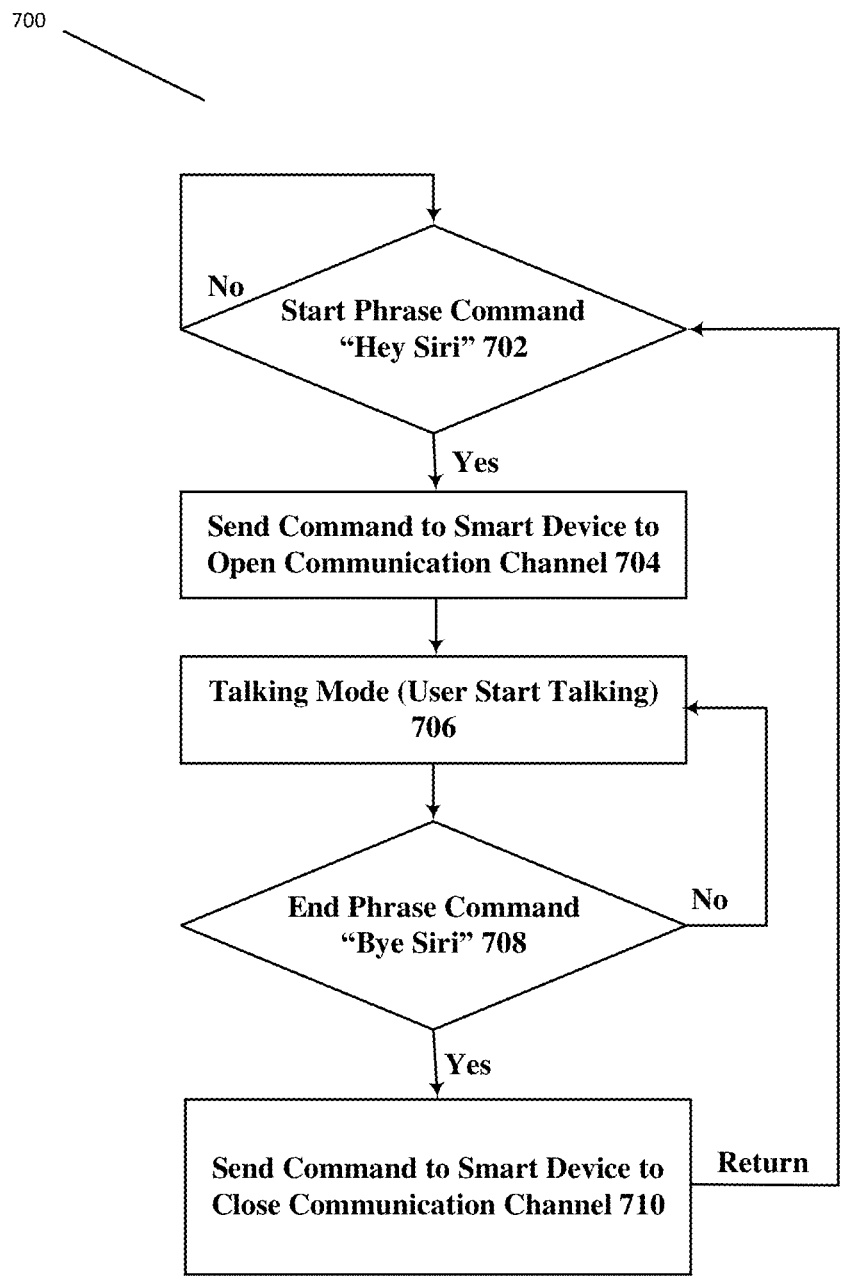
FIG. 7 is another example flow diagram applicable to using a communication device in communication with a two way communication system in accordance with various embodiments described herein.

FIG. 7 is another example flow diagram 700 applicable to using a communication device in communication with a two way communication system in accordance with various embodiments described herein. In this example flow diagram, an automated assistant can be used instead of a hardware two way radio system or a software two way radio application on a smartphone. For instance, at 702, the Bluetooth communication device waits for the start phrase, such as "Hey Siri", and in response to receiving the start phrase, a command is sent to the smart device to open a communication channel (enter talk mode) at 704, at which point the user can start talking at 706. When the user is finished talking, the user can utter an end phrase, such as "Bye Siri" at 708, at which point the communication channel is closed (enter listen mode or end the session) at 710 until re-opened with the start phrase again.

Figure 8:
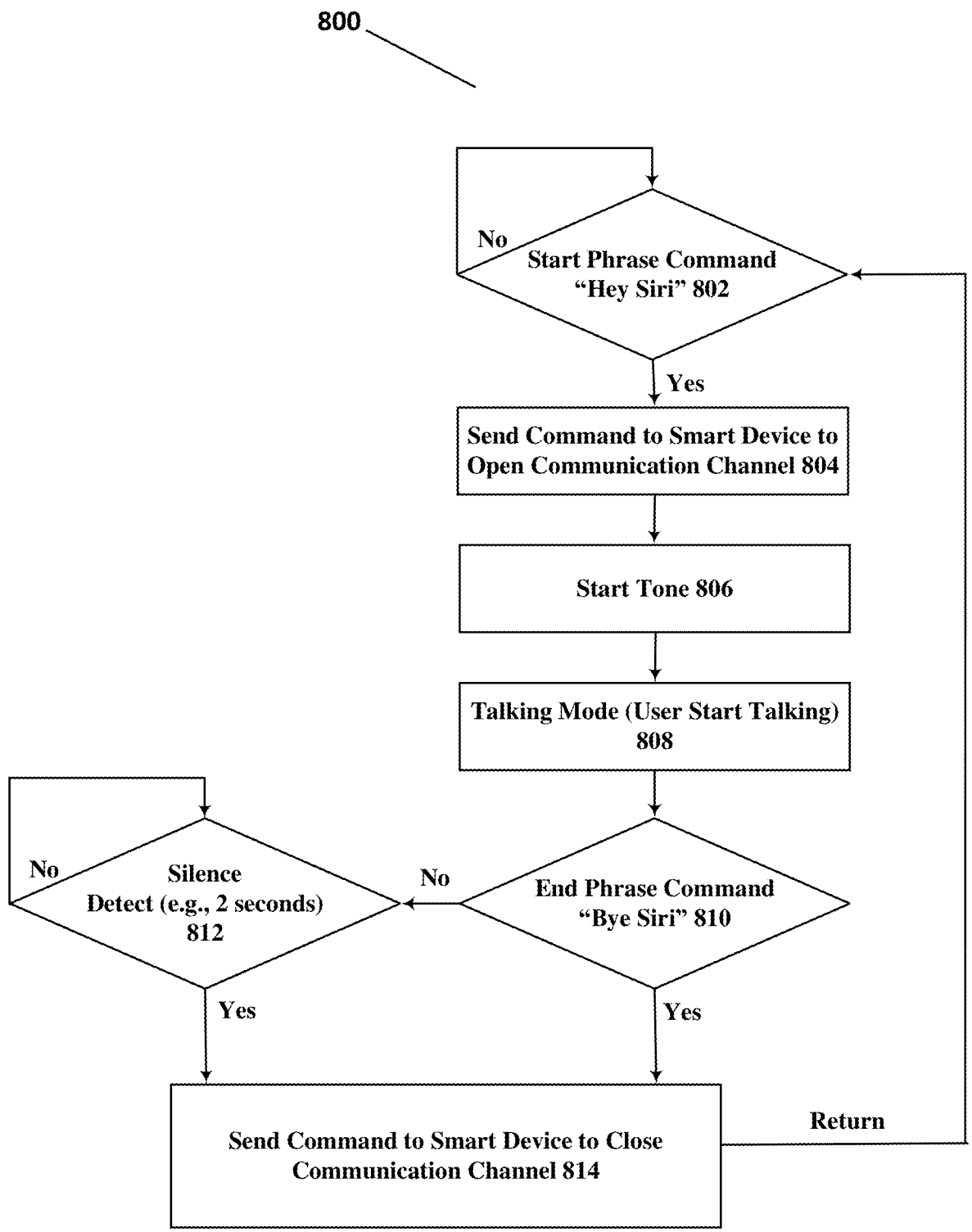
FIG. 8 is another example flow diagram applicable to using a communication device in communication with a two way communication system in accordance with various embodiments described herein.

FIG. 8 is another example flow diagram 800 applicable to using a communication device in communication with a two way communication system in accordance with various embodiments described herein. For instance, at 802, the Bluetooth communication device waits for the start phrase, such as "Hey Siri", and in response to receiving the start phrase, a command is sent to the smart device to open a communication channel (enter talk mode) at 804, at which point the user can start talking at 808. In this example, a start tone 806 is played before the user starts talking in talk mode as helpful feedback to the user that the talk mode has begun. When the user is finished talking, the user can utter an end phrase, such as "Bye Siri" at 810, at which point the communication channel is closed at 814 until re-opened with the start phrase again. As mentioned, optionally, as shown at 812, an additional step of waiting for a set amount of silence can be observed before confirming that the user wishes to close the communication channel (enter listen mode or end the session).

Figure 9:
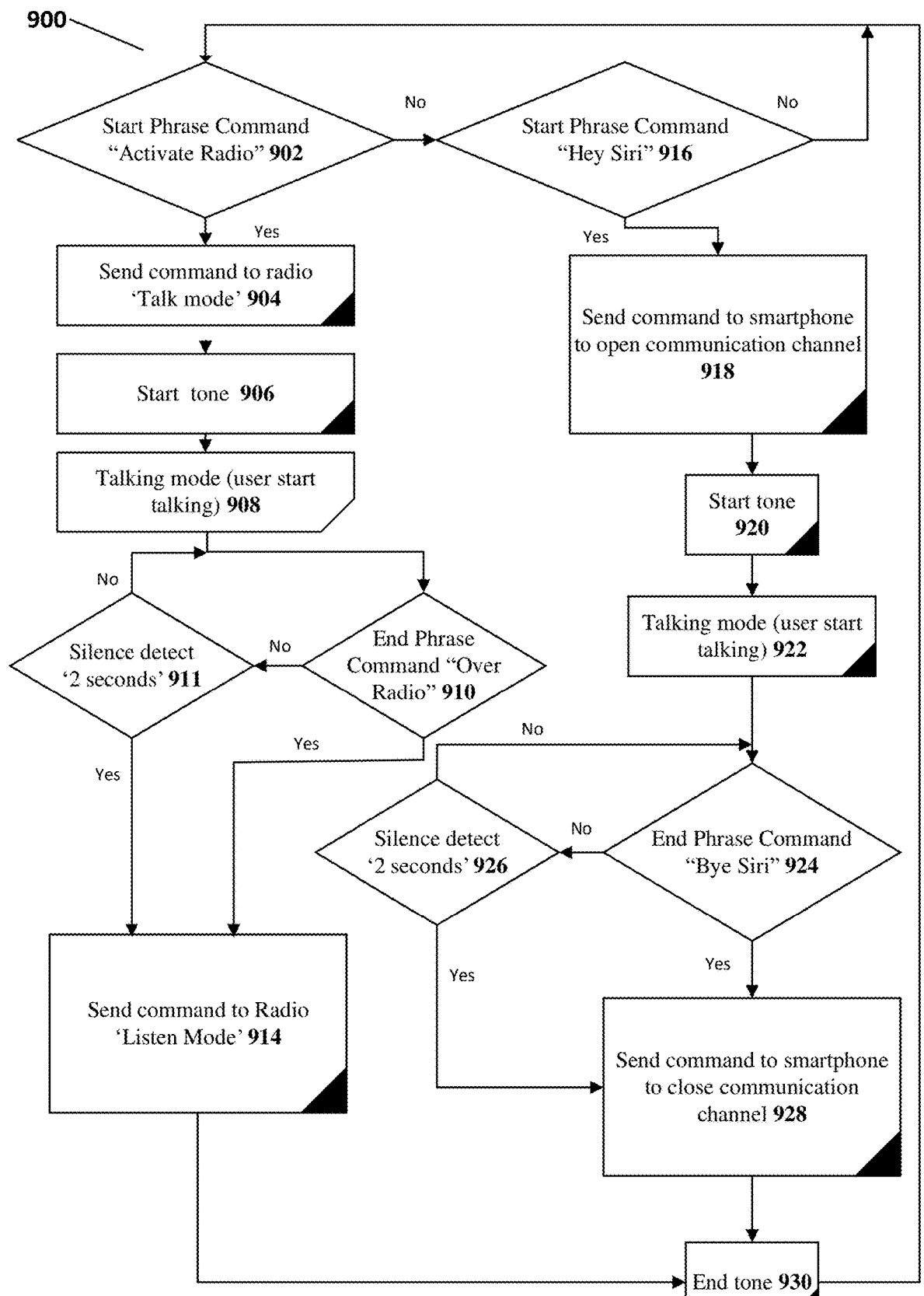
FIG. 9 is another example flow diagram applicable to using a communication device in communication with a two way communication system in accordance with various embodiments described herein.

FIG. 9 is another example flow diagram 900 applicable to using a communication device in communication with a two way communication system in accordance with various embodiments described herein. The system of FIG. 9 illustrates that the software and hardware two way radio systems can both cooperate with the Bluetooth communication device, such as a headset. For instance, at 902, the "activate radio" start phrase command can be uttered, causing the Bluetooth communication device to command the local hardware two way radio to enter the talk mode at 904, along with a corresponding tone at 906, and the talk mode is maintained at 908 until the end phrase is heard at 910 along with the optional silence period at 912. At that point, the Bluetooth communication device commands the local hardware two way radio to enter the listen mode at 914 along with the rendering of an "end talk mode" tone 930.

Similarly, the user might utter the software start phrase command at 916, such as "Hey Siri" instead of the hardware start phrase at 902, in which case, the Bluetooth communication device causes the software application of a smart device, such as an automated assistant or mobile phone, to open a communication channel at 918 to a remote software application, along with a corresponding tone at 920 to signal that the talking mode has begun enabling the user to talk at 922. Similar to the hardware flow, when the user is done talking, the user utters the end phrase, such as "Bye Siri" at 924, along with an optional silence period at 926 to ensure intent oof the user, before closing the communication channel at 928, and along with the end tone 930 that signals the end of the talking mode. FIG. 9 thus illustrates that the two way radio can be implemented in software and/or hardware, and can function in parallel (though typically would be used one at a time, either software or hardware, though both systems could be put into talk mode if desired using the respective start phrases, as well as ended independently via respective end phrases).

FIG. 10 is yet another example flow diagram applicable to using a communication device in communication with a two way communication system in accordance with various embodiments described herein. In this regard, a method can comprise, at 1002, detecting, by a wearable Bluetooth communication system comprising a processor, at least one speaker and at least one microphone, a trigger word or phrase represented by a first sound signal generated at least in part by a first voice of a first user of the wearable Bluetooth communication system, resulting in a detected trigger word or phrase, the detected trigger word or phrase comprising one of a transmission mode trigger word or phrase or a reception mode trigger word or phrase. As described at 1004, the wearable Bluetooth communication system is usable by the first user without use of a hand of the first user. The wearable Bluetooth communication system is pairable with a local Bluetooth two way radio, within a Bluetooth connection range of the wearable Bluetooth communication system defined by a Bluetooth communication protocol, the local Bluetooth two way radio being configured to, using a second communication protocol different than the Bluetooth communication protocol, transmit or receive signals, respectively, to or from a remote two way radio, in response to being in a transmission mode or a reception mode, respectively.

Furthermore, at 1006, the method can comprise, in response to the detected trigger word or phrase being determined to be the transmission mode trigger word or phrase, directing, by the wearable Bluetooth communication system, the local two radio to be in the transmission mode, entering, by the wearable Bluetooth communication system, the transmission mode, rendering, by the at least one speaker, a second sound signal indicative of the transmission mode, to the first user, and sending, by the wearable Bluetooth communication system to the local Bluetooth two way radio using the Bluetooth communication protocol, the first sound signal and the second sound signal indicative of the transmission mode, in furtherance of the first sound signal and the second sound signal being further sent to the remote two way radio to be rendered to a second user of the remote two way radio.

In one non-limiting embodiment, the method can further comprise, in response to the detected trigger word or phrase being determined to be the reception mode trigger word or phrase, entering, by the wearable Bluetooth communication system, the reception mode, directing, by the wearable Bluetooth communication system, the local Bluetooth two way radio to be in the reception mode, sending, by the wearable Bluetooth communication system to the local Bluetooth two way radio using the Bluetooth communication protocol, a third sound signal indicative of the reception mode, in furtherance of the third sound signal being further sent to the remote two way radio to be rendered to the second user of the remote two way radio, receiving, by the wearable Bluetooth communication system, a fourth sound signal, which was generated at least in part by a second voice of the second user of the remote two way radio and received by the wearable Bluetooth communication system via the local two way radio from the remote two way radio, and rendering, by the at least one speaker, the third sound signal indicative of the reception mode and the fourth sound signal, to the first user.

Optionally, the entering of the transmission mode comprises opening a transmission channel to the local Bluetooth two way radio usable to transmit signals to the remote two way radio via the local Bluetooth two way radio, and the entering of the reception mode comprises closing the transmission channel and opening a reception channel to the local Bluetooth two way radio usable to receive signals from the remote two way radio via the local Bluetooth two way radio.

For another example, the directing of the local Bluetooth two radio to be in the transmission mode comprises sending a first command packet comprising at least one of a first packet type associated with the transmission mode, a first data length associated with the first command packet, or a first command identifier associated with the first command packet and the directing of the local Bluetooth two radio to be in the reception mode comprises sending a second command packet comprising at least one of a second packet type associated with the reception mode, a second data length associated with the second command packet, or a second command identifier associated with the second command packet.

Also, the method can further comprise rendering, by the at least one speaker, the first sound signal to the first user, wherein at least one of the second sound signal indicative of the transmission mode is represented as a first tonal sound signal representative of a first tone signifying the transmission mode, or the fourth sound signal indicative of the reception mode is represented as a second tonal sound signal representative of a second tone, different than the first tone, signifying the reception mode.

The method can further comprise one or more of detecting, by the wearable Bluetooth communication system, at least a defined period of absence of the first voice of the first user, and, in response to the detecting of at least the defined period of absence of the first voice of the first user, entering, by the wearable Bluetooth communication system, the reception mode, directing, by the wearable Bluetooth communication system, the local Bluetooth two radio to be in the reception mode, sending, by the wearable Bluetooth communication system to the local Bluetooth two way radio using the Bluetooth communication protocol, a third sound signal indicative of the reception mode, in furtherance of the third sound signal being further sent to the remote two way radio to be rendered to the second user of the remote two way radio, receiving, by the wearable Bluetooth communication system, a fourth sound signal, which was generated at least in part by a second voice of the second user of the remote two way radio and received by the wearable Bluetooth communication system via the local two way radio from the remote two way radio, and rendering, by the at least one speaker, the fourth sound signal and the third sound signal indicative of the reception mode, to the first user.

The wearable Bluetooth communication system can be part of a Bluetooth headphone, a Bluetooth helmet, at least one Bluetooth earbud, a Bluetooth armband, a Bluetooth watch, or a Bluetooth jewelry.

Further, the method can comprise identifying, by the wearable Bluetooth communication system, a noise signal associated with the first sound signal, and processing, by the wearable Bluetooth communication system, the first sound signal to substantially reduce or eliminate the noise signal from the first sound signal, resulting in a processed first sound signal. The sending of the first sound signal can comprise sending, to the local Bluetooth two way radio, the processed first sound signal. Also, the processing of the first sound signal can comprise applying at least one of echo cancellation, interference sound cancellation, or environmental noise cancellation to the first sound signal to substantially reduce or eliminate the noise signal from the first sound signal.

The method can optionally include receiving authorized user input, associated with the first user, that specifies at least one of the transmission mode trigger word or phrase or the reception mode trigger word or phrase.

As mentioned, the local Bluetooth two way radio can be a software two-way radio application that is executing via a mobile device paired with the wearable Bluetooth communication system using the Bluetooth communication protocol and that communicates with a corresponding software two-way radio application of the remote two way radio.

The method can further comprise, as an alternative to the directing, the entering, the rendering, and the sending being in response to the detected trigger word or phrase being determined to be the transmission mode trigger word or phrase, performing the directing, the entering, the rendering, and the sending in response to a push to talk button of the wearable Bluetooth communication system being activated.

As mentioned, in one embodiment the Bluetooth communication device is a Bluetooth headset that comprises a Bluetooth module configured to pair wirelessly, according to a Bluetooth protocol, with a first two way radio of a two way radio system. In this regard, the two way radio system comprises the first two way radio of the two way radio system that is within a Bluetooth communication range of the Bluetooth headset, and a second two way radio that is not within the Bluetooth communication range of the Bluetooth headset. The Bluetooth headset further comprises a voice command engine configured to detect a trigger sound from a voice input associated with a user of the Bluetooth headset, the trigger sound being one of: a first trigger sound that, based on the Bluetooth headset and the two way radio system being in a receive sound mode, activates a transmit sound mode of the Bluetooth headset, or a second trigger sound that, based on the Bluetooth headset and the two way radio system being in the transmit sound mode, activates a receive sound mode of the Bluetooth headset.

Additionally, the Bluetooth headset comprises a flow control engine configured to, based on the trigger sound being determined to be the first trigger sound, send a first command to the first two way radio to activate the transmit sound mode in the first two way radio. In the transmit sound mode, the first two way radio relays, to the second two way radio, first sound that has been input to the Bluetooth headset after the trigger sound, processed by the Bluetooth headset, and output by the Bluetooth headset via the Bluetooth protocol to the first two way radio. Alternatively, based on the trigger sound being determined to be the second trigger sound, the flow control engine can send a second command to the first two way radio to activate the receive sound mode in the first two way radio. In the receive sound mode, the first two way radio relays, to the Bluetooth headset, second sound that has been output by the second two way radio to first two way radio, and received by the Bluetooth headset via the Bluetooth protocol from the first two way radio.

The voice command engine can be further configured to, based on the trigger sound being determined to be the first trigger sound, output at least one first tonal sound from the Bluetooth headset to the user to indicate the transmit sound mode has been activated in the Bluetooth headset and first two way radio, or, based on the trigger sound being determined to be the second trigger sound, output at least one second tonal sound from the Bluetooth headset to the user to indicate the receive sound mode has been activated in the Bluetooth headset and first two way radio.

The voice command engine can be further configured to, based further on the trigger sound being determined to be the first trigger sound, relay the at least one first tonal sound from the Bluetooth headset to the second two way radio via the first two way radio to be rendered at the second two way radio, or, based further on the trigger sound being determined to be the second trigger sound, output the at least one second tonal sound from the Bluetooth headset to the second two way radio via the first two way radio to be rendered at the second two way radio. In this regard, optionally, the at least one first tonal sound comprises at least one same tonal sound as the at least one second tonal sound, or they can be different tonal sounds Where the trigger sound has been determined to be the first trigger sound, the voice command engine can be further configured to output at least one first tonal sound from the Bluetooth headset to the user to indicate the transmit sound mode has been activated in the Bluetooth headset and first two way radio, in response to an elapsing of at least a defined period of voice inactivity from the user, send a second command to the first two way radio to activate the receive sound mode in the first two way radio, output at least one second tonal sound from the Bluetooth headset to the user to indicate the receive sound mode has been activated in the Bluetooth headset and first two way radio, and output the at least one second tonal sound from the Bluetooth headset to the second two way radio via the first two way radio to be rendered at the second two way radio.

It is noted that detection of the trigger sound, by the voice command engine, from the voice input associated with the user of the Bluetooth headset can comprise the detection of the voice input from all sound input concurrently received by the Bluetooth headset, the detection of the voice input from all of the sound input comprising a processing of all of the sound input received by the Bluetooth headset to increase a defined clarity of the voice input relative to other sound inputs of all of the sound input other than the voice input. Further, the processing can comprise at least one of applying at least one of an echo cancellation process to substantially reduce or eliminate echo sound input relating to delayed reproduction of the voice input, an interference reduction process to reduce an interference associated with the voice input, an interference cancellation process to eliminate the interference associated with the voice input, an environmental sound reduction process to reduce an environmental sound input associated with an environment in which the Bluetooth headset is situated, or an environmental noise cancellation process to eliminate the environmental sound input associated with the environment.

The Bluetooth module can be further configured to pair with a mobile device associated with the user, and the voice command engine can be further configured to detect a third trigger sound as the trigger sound. In this regard, detection of the third trigger sound, based on the Bluetooth headset being in the receive sound mode or the transmit sound mode, causes the Bluetooth headset to switch from being paired with the two way radio system to being paired with a communication module of the mobile device that is not the two way radio system, and activates a mobile device transmit and receive mode of the Bluetooth headset that enables bi-directional sound to be communicated, via the mobile device, between the user of the Bluetooth headset and another user of another mobile device to which the mobile device is communicatively coupled.

Figure 11:
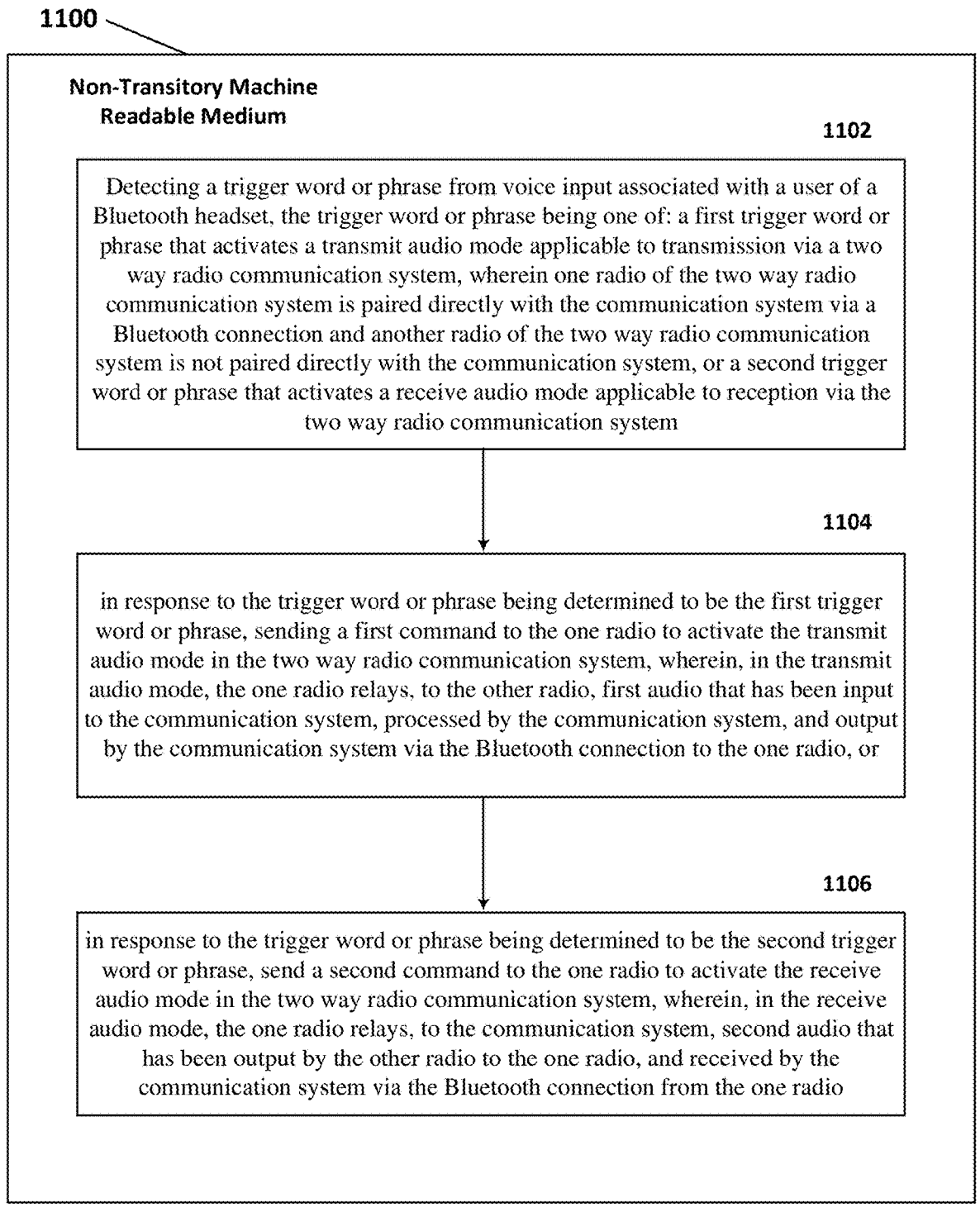
FIG. 11 is still another example flow diagram applicable to using a communication device in communication with a two way communication system in accordance with various embodiments described herein.

FIG. 11 is still another example flow diagram applicable to using a communication device in communication with a two way communication system in accordance with various embodiments described herein. In this example embodiment, a non-transitory machine-readable medium 1100, comprises executable instructions that, when executed by a processor of a communication system, facilitate performance of operations. At 1102, the operations comprise detecting a trigger word or phrase from voice input associated with a user of a Bluetooth headset, the trigger word or phrase being one of: A) a first trigger word or phrase that activates a transmit audio mode applicable to transmission via a two way radio communication system, wherein one radio of the two way radio communication system is paired directly with the communication system via a Bluetooth connection and another radio of the two way radio communication system is not paired directly with the communication system, or B) a second trigger word or phrase that activates a receive audio mode applicable to reception via the two way radio communication system.

At 1104, the operations comprise, in response to the trigger word or phrase being determined to be the first trigger word or phrase, sending a first command to the one radio to activate the transmit audio mode in the two way radio communication system, wherein, in the transmit audio mode, the one radio relays, to the other radio, first audio that has been input to the communication system, processed by the communication system, and output by the communication system via the Bluetooth connection to the one radio, or, at 1106, the operations comprise, in response to the trigger word or phrase being determined to be the second trigger word or phrase, send a second command to the one radio to activate the receive audio mode in the two way radio communication system, wherein, in the receive audio mode, the one radio relays, to the communication system, second audio that has been output by the other radio to the one radio, and received by the communication system via the Bluetooth connection from the one radio.

Optionally, the operations can further comprise at least one of, in response to activation of the transmit audio mode, generating and rendering a first tonal sound to a user of the communication system to indicate the activation of the transmit sound mode to the user, or, in response to activation of the receive audio mode, generating and rendering a second tonal sound, different from the first tonal sound, to the user of the communication system to indicate the activation of the receive audio mode to the user.

Figure 12:
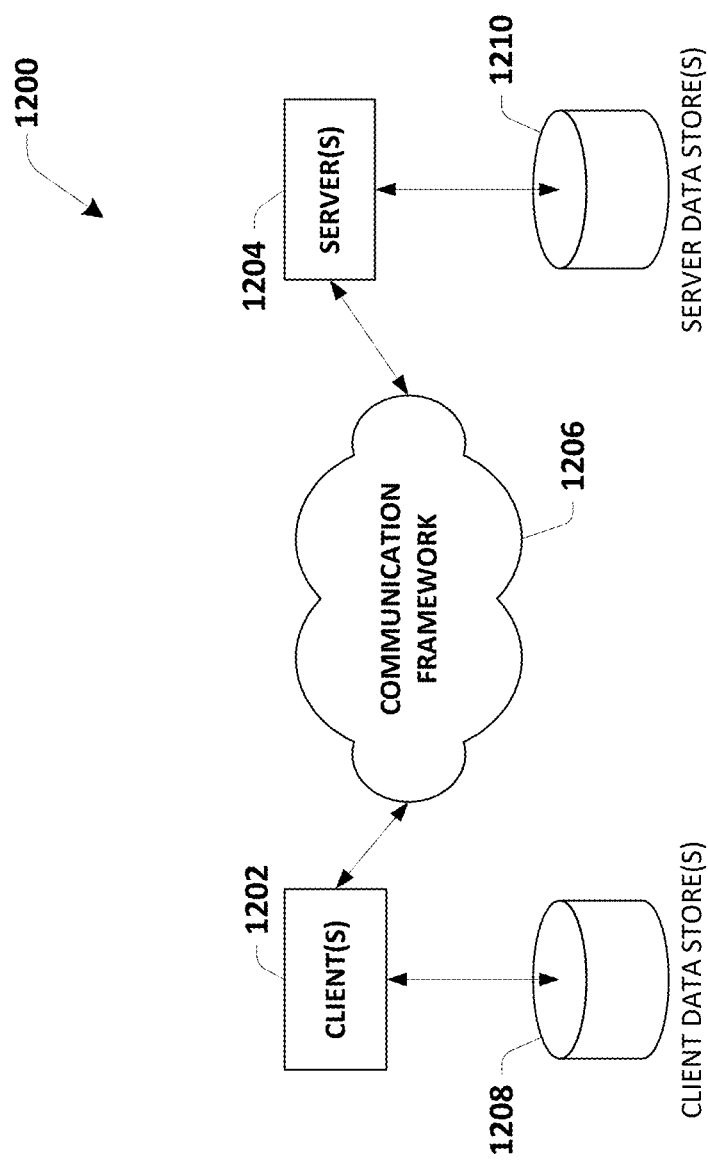
FIG. 12 illustrates a non-limiting networking environment in which one or more embodiments described herein can be implemented.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring now to FIG. 12, there is illustrated a schematic block diagram of a computing environment 1200 in accordance with this specification. The system 1200 includes one or more client(s) 1202, (e.g., computers, smart phones, tablets, cameras, PDA's), which can implement a two way radio system in software and/or hardware as described herein. In this regard, the client(s) 1202 can be hardware and/or software (e.g., threads, processes, computing devices). The client(s) 1202 can house cookie(s) and/or associated contextual information by employing the specification, for example.

The system 1200 also includes one or more server(s) 1204. The server(s) 1204 can also be hardware or hardware in combination with software (e.g., threads, processes, computing devices), and facilitate an implementation of a two way radio system. The servers 1204 can house threads to perform transformations of media items by employing aspects of this disclosure, for example. One possible communication between a client 1202 and a server 1204 can be in the form of a data packet adapted to be transmitted between two or more computer processes wherein data packets can include coded analyzed headspaces and/or input. The data packet can include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

In one exemplary implementation, a client 1202 can transfer an encoded file, (e.g., encoded media item), such as voice data packets, to server 1204 for further processing as part of a server facilitated or implemented two way radio system. Server 1204 can store the file, decode the file, or transmit the file to another client 1202. It is to be appreciated, that a client 1202 can also transfer uncompressed file to a server 1204 and server 1204 can compress the file and/or transform the file in accordance with this disclosure. Likewise, server 1204 can encode information and transmit the information via communication framework 1206 to one or more clients 1202.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, e.g., the set with no elements therein. Thus, a "set" in the subject disclosure includes one or more elements or entities.

Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    detecting, by a wearable Bluetooth device comprising at least one processor, at least one speaker and at least one microphone, a trigger word or phrase represented by a first sound signal generated at least in part by a first voice of a first user of the wearable Bluetooth device, resulting in a detected trigger word or phrase, the detected trigger word or phrase comprising one of a transmission mode trigger word or phrase or a reception mode trigger word or phrase,
    wherein the wearable Bluetooth device is used by the first user without use of a hand of the first user,
    wherein the wearable Bluetooth device is paired with a local Bluetooth two way radio, within a Bluetooth connection range of the wearable Bluetooth device defined by a Bluetooth communication protocol, the local Bluetooth two way radio being configured to, using a second communication protocol different than the Bluetooth communication protocol, transmit or receive signals, respectively, to or from a remote two way radio, in response to being in a transmission mode or a reception mode, respectively; and
    in response to the detected trigger word or phrase being determined to be the transmission mode trigger word or phrase,
        directing, by the wearable Bluetooth device, the local Bluetooth two way radio to be in the transmission mode,
        entering, by the wearable Bluetooth device, the transmission mode,
        rendering, by the at least one speaker, a second sound signal indicative of the transmission mode, to the first user, and
        sending, by the wearable Bluetooth device to the local Bluetooth two way radio using the Bluetooth communication protocol, the first sound signal and the second sound signal indicative of the transmission mode, in furtherance of the first sound signal and the second sound signal being further sent to the remote two way radio to be rendered to a second user of the remote two way radio.

2. The method of claim 1, further comprising:
    in response to the detected trigger word or phrase being determined to be the reception mode trigger word or phrase,
        entering, by the wearable Bluetooth device, the reception mode,
        directing, by the wearable Bluetooth device, the local Bluetooth two way radio to be in the reception mode,
        sending, by the wearable Bluetooth device to the local Bluetooth two way radio using the Bluetooth communication protocol, a third sound signal indicative of the reception mode, in furtherance of the third sound signal being further sent to the remote two way radio to be rendered to the second user of the remote two way radio,
        receiving, by the wearable Bluetooth device, a fourth sound signal, which was generated at least in part by a second voice of the second user of the remote two way radio and received by the wearable Bluetooth device via the local Bluetooth two way radio from the remote two way radio, and
        rendering, by the at least one speaker, the third sound signal indicative of the reception mode and the fourth sound signal, to the first user.

3. The method of claim 2, wherein the entering of the transmission mode comprises opening a transmission channel to the local Bluetooth two way radio used to transmit signals to the remote two way radio via the local Bluetooth two way radio, and wherein the entering of the reception mode comprises closing the transmission channel and opening a reception channel to the local Bluetooth two way radio used to receive signals from the remote two way radio via the local Bluetooth two way radio.

4. The method of claim 2, wherein the directing of the local Bluetooth two way radio to be in the transmission mode comprises sending a first command packet comprising at least one of a first packet type associated with the transmission mode, a first data length associated with the first command packet, or a first command identifier associated with the first command packet and wherein the directing of the local Bluetooth two way radio to be in the reception mode comprises sending a second command packet comprising at least one of a second packet type associated with the reception mode, a second data length associated with the second command packet, or a second command identifier associated with the second command packet.

5. The method of claim 2, further comprising rendering, by the at least one speaker, the first sound signal to the first user, wherein at least one of the second sound signal indicative of the transmission mode is represented as a first tonal sound signal representative of a first tone signifying the transmission mode, or the fourth sound signal indicative of the reception mode is represented as a second tonal sound signal representative of a second tone, different than the first tone, signifying the reception mode.

6. The method of claim 1, further comprising:
    detecting, by the wearable Bluetooth device, at least a defined period of absence of the first voice of the first user;
    in response to the detecting of at least the defined period of absence of the first voice of the first user,
        entering, by the wearable Bluetooth device, the reception mode,
        directing, by the wearable Bluetooth device, the local Bluetooth two way radio to be in the reception mode,
        sending, by the wearable Bluetooth device to the local Bluetooth two way radio using the Bluetooth communication protocol, a third sound signal indicative of the reception mode, in furtherance of the third sound signal being further sent to the remote two way radio to be rendered to the second user of the remote two way radio, receiving, by the wearable Bluetooth device, a fourth sound signal, which was generated at least in part by a second voice of the second user of the remote two way radio and received by the wearable Bluetooth device via the local Bluetooth two way radio from the remote two way radio, and rendering, by the at least one speaker, the fourth sound signal and the third sound signal indicative of the reception mode, to the first user.

7. The method of claim 1, wherein the wearable Bluetooth device comprises a Bluetooth headphone, a Bluetooth helmet, at least one Bluetooth earbud, a Bluetooth armband, a Bluetooth watch, or a Bluetooth jewelry.

8. The method of claim 1, further comprising:
identifying, by the wearable Bluetooth device, a noise signal associated with the first sound signal; and
processing, by the wearable Bluetooth device, the first sound signal to reduce or eliminate the noise signal from the first sound signal, resulting in a processed first sound signal,
wherein the sending of the first sound signal comprises sending, to the local Bluetooth two way radio, the processed first sound signal.

9. The method of claim 8, wherein the processing of the first sound signal comprises applying at least one of echo cancellation, interference sound cancellation, or environmental noise cancellation to the first sound signal to reduce or eliminate the noise signal from the first sound signal.

10. The method of claim 1, further comprising:
receiving authorized user input, associated with the first user, that specifies at least one of the transmission mode trigger word or phrase or the reception mode trigger word or phrase.

11. The method of claim 1, wherein the local Bluetooth two way radio is a software two-way radio application that is executing via a mobile device paired with the wearable Bluetooth device using the Bluetooth communication protocol and that communicates with a corresponding software two-way radio application of the remote two way radio.

12. The method of claim 1, further comprising:
as an alternative to the directing, the entering, the rendering, and the sending being in response to the detected trigger word or phrase being determined to be the transmission mode trigger word or phrase, performing the directing, the entering, the rendering, and the sending in response to a push to talk button of the wearable Bluetooth device being activated.

13. A Bluetooth headset, comprising:
a Bluetooth module configured to pair wirelessly, according to a Bluetooth protocol, with a first two way radio of a two way radio system, wherein the Bluetooth headset is within a Bluetooth communication range of the first two way radio, and wherein the Bluetooth headset is not within range of a second two way radio of the two way radio system;
a voice command engine configured to detect a trigger sound from a voice input associated with a user of the Bluetooth headset, the trigger sound being one of:
  a first trigger sound that, based on the Bluetooth headset and the two way radio system being in a receive sound mode, activates a transmit sound mode of the Bluetooth headset, or
  a second trigger sound that, based on the Bluetooth headset and the two way radio system being in the transmit sound mode, activates a receive sound mode of the Bluetooth headset; and
a flow control engine configured to:
  based on the trigger sound being determined to be the first trigger sound, send a first command to the first two way radio to activate the transmit sound mode in the first two way radio, wherein, in the transmit sound mode, the first two way radio relays, to the second two way radio, first sound that has been input to the Bluetooth headset after the trigger sound, processed by the Bluetooth headset, and output by the Bluetooth headset via the Bluetooth protocol to the first two way radio, or
  based on the trigger sound being determined to be the second trigger sound, send a second command to the first two way radio to activate the receive sound mode in the first two way radio, wherein, in the receive sound mode, the first two way radio relays, to the Bluetooth headset, second sound that has been output by the second two way radio to the first two way radio, and received by the Bluetooth headset via the Bluetooth protocol from the first two way radio,
wherein the voice command engine is further configured to:
  based on the trigger sound being determined to be the first trigger sound, output at least one first tonal sound from the Bluetooth headset to the user to indicate the transmit sound mode has been activated in the Bluetooth headset and the first two way radio, or
  based on the trigger sound being determined to be the second trigger sound, output at least one second tonal sound from the Bluetooth headset to the user to indicate the receive sound mode has been activated in the Bluetooth headset and the first two way radio.

14. The Bluetooth headset of claim 13, wherein the voice command engine is further configured to:
based further on the trigger sound being determined to be the first trigger sound, relay the at least one first tonal sound from the Bluetooth headset to the second two way radio via the first two way radio to be rendered at the second two way radio, or
based further on the trigger sound being determined to be the second trigger sound, output the at least one second tonal sound from the Bluetooth headset to the second two way radio via the first two way radio to be rendered at the second two way radio, wherein the at least one first tonal sound comprises at least one same tonal sound as the at least one second tonal sound.

15. The Bluetooth headset of claim 13, wherein the trigger sound has been determined to be the first trigger sound, and wherein the voice command engine is further configured to:
output at least one first tonal sound from the Bluetooth headset to the user to indicate the transmit sound mode has been activated in the Bluetooth headset and the first two way radio,
in response to an elapsing of at least a defined period of voice inactivity from the user, send a second command to the first two way radio to activate the receive sound mode in the first two way radio,
output at least one second tonal sound from the Bluetooth headset to the user to indicate the receive sound mode has been activated in the Bluetooth headset and the first two way radio, and output the at least one second tonal sound from the Bluetooth headset to the second two way radio via the first two way radio to be rendered at the second two way radio.

16. The Bluetooth headset of claim 13, wherein detection of the trigger sound, by the voice command engine, from the voice input associated with the user of the Bluetooth headset comprises the detection of the voice input from all sound input concurrently received by the Bluetooth headset, the detection of the voice input from all of the sound input comprising a processing of all of the sound input received by the Bluetooth headset to increase a defined clarity of the voice input relative to other sound inputs of all of the sound input other than the voice input, and the processing comprising at least one of applying at least one of an echo cancellation process to reduce or eliminate echo sound input relating to delayed reproduction of the voice input, an interference reduction process to reduce an interference associated with the voice input, an interference cancellation process to eliminate the interference associated with the voice input, an environmental sound reduction process to reduce an environmental sound input associated with an environment in which the Bluetooth headset is situated, or an environmental noise cancellation process to eliminate the environmental sound input associated with the environment.

17. The Bluetooth headset of claim 13, wherein the Bluetooth module is further configured to pair with a mobile device associated with the user,
wherein the voice command engine is further configured to detect a third trigger sound as the trigger sound, and
wherein detection of the third trigger sound, based on the Bluetooth headset being in the receive sound mode or the transmit sound mode,
causes the Bluetooth headset to switch from being paired with the two way radio system to being paired with a communication module of the mobile device that is not the two way radio system, and
activates a mobile device transmit and receive mode of the Bluetooth headset that enables bi-directional sound to be communicated, via the mobile device, between the user of the Bluetooth headset and another user of another mobile device to which the mobile device is communicatively coupled.

18. A non-transitory machine-readable medium, comprising executable instructions that, when executed by a processor of a communication system, facilitate performance of operations, comprising:
detecting a trigger word or phrase from voice input associated with a user of a Bluetooth headset, the trigger word or phrase being one of:
a first trigger word or phrase that activates a transmit audio mode applicable to transmission via a two way radio communication system, wherein one radio of the two way radio communication system is paired directly with the communication system via a Bluetooth connection and another radio of the two way radio communication system is not paired directly with the communication system, or
a second trigger word or phrase that activates a receive audio mode applicable to reception via the two way radio communication system; and in response to the trigger word or phrase being determined to be the first trigger word or phrase, sending a first command to the one radio to activate the transmit audio mode in the two way radio communication system, wherein, in the transmit audio mode, the one radio relays, to the other radio, first audio that has been input to the communication system, processed by the communication system, and output by the communication system via the Bluetooth connection to the one radio, or
in response to the trigger word or phrase being determined to be the second trigger word or phrase, send a second command to the one radio to activate the receive audio mode in the two way radio communication system, wherein, in the receive audio mode, the one radio relays, to the communication system, second audio that has been output by the other radio to the one radio, and received by the communication system via the Bluetooth connection from the one radio,
wherein the operations further comprise at least one of:
in response to activation of the transmit audio mode, generating and rendering a first tonal sound to a user of the communication system to indicate the activation of the transmit audio mode to the user, or
in response to activation of the receive audio mode, generating and rendering a second tonal sound, different from the first tonal sound, to the user of the communication system to indicate the activation of the receive audio mode to the user.

19. The non-transitory machine-readable medium of claim 18, wherein the operations further comprise:
based on the trigger word or phrase being determined to be the first trigger word or phrase, output at least one first tonal sound from the Bluetooth headset to the user to indicate the transmit audio mode has been activated in the Bluetooth headset and a first two way radio, or
based on the trigger word or phrase being determined to be the second trigger word or phrase, output at least one second tonal sound from the Bluetooth headset to the user to indicate the receive audio mode has been activated in the Bluetooth headset and the first two way radio.

20. The non-transitory machine-readable medium of claim 18, wherein the trigger word or phrase has been determined to be the first trigger word or phrase, and wherein the operations further comprise:
outputting at least one first tonal sound from the Bluetooth headset to the user to indicate the transmit audio mode has been activated in the Bluetooth headset and a first two way radio,
in response to an elapsing of at least a defined period of voice inactivity from the user, sending a second command to the first two way radio to activate the receive audio mode in the first two way radio,
outputting at least one second tonal sound from the Bluetooth headset to the user to indicate the receive audio mode has been activated in the Bluetooth headset and the first two way radio, and
outputting the at least one second tonal sound from the Bluetooth headset to a second two way radio via the first two way radio to be rendered at the second two way radio.

* * * * *